United States Patent Office 3,776,844
Patented Dec. 4, 1973

3,776,844
COMPOSITION AND METHOD FOR TREATING FIBROUS MATERIAL
James E. Nayfa, 1209 Levee St., Dallas, Tex. 75207
No Drawing. Continuation of abandoned application Ser. No. 727,021, May 6, 1968. This application Mar. 5, 1971, Ser. No. 121,566
Int. Cl. D06m 13/46, 13/34
U.S. Cl. 252—8.75          3 Claims

ABSTRACT OF THE DISCLOSURE

A composition for treating seed cotton preparatory for ginning, as by way of a fog or mist during its passage from the cleaning operations, to prevent deterioration thereof during the ginning process and to preserve the staple and luster of the fibers, and thus improve the product as to marketability and spinning qualities in the textile industry where uniformity in fiber lengths is important. One constituent of the composition is a cationic surface active agent of the alkyl imidazoline class containing hydrocarbon substituents derived from animal and vegetable fats and converted to an ionic salt by reaction with alkyl sulfate, minimizing or eliminating static electricity and thereby reducing fire hazards and the tendency of the adherence of sticks and trash to the lint cotton. A second constituent is a lubricating constituent such as an amine halide.

This application is a continuation of my pending application Ser. No. 727,021, filed May 6, 1968, now abandoned.

SUMMARY

This invention relates to a cationic composition for the treatment of seed cotton, prior to the ginning operation, during its passage from the cleaning apparatus, and prior to its introduction to the gin stands, whereby to insure a maximum staple length for the fibers and to preserve their natural luster, containing an ionic sulfate salt of an amino compound having at least one hydrocarbon chain of an animal or vegetable fat or oil.

A prime object of the invention resides in the provision of a cationic surface active agent such as an alkyl imidazoline compound in a water base and containing a hydrocarbon chain derived from organic acids found in animal and vegetable fats, and converted to an ionic salt by reaction with a member of the lower $C_1$–$C_5$ alkyl sulfate family, whereby to treat the seed cotton before entering the gin stands by injecting the composition into the presence thereof in a vaporous state, as a fog or mist, in such quantities as to thoroughly coat the material without adding any appreciable amount of moisture.

Another object of the invention is that of providing a composition which is non-flammable and non-toxic and which does not affect the dyeability of the cotton fibers, but provides a synthetic shield or coating thereon, through a lubricating constituent such as an amine halide, to preserve the inherent natural quality thereof which is often dissipated through the friction generated by the cotton as it flows through the ginning apparatus.

A further object of the invention is that of providing a composition which is capable of maintaining the fibers in the best possible condition for ginning, minimizing the effects of excess moisture which would reduce the efficiency of the ginning equipment while also acting to prevent excess dryness which results in the fibers becoming brittle and thus affecting the staple length when acted upon by the gin saws.

A still further object is that of providing a compound including an anti-static constituent such as an alkyl imidazoline compound, and a lubricating constituent such as an amine halide.

Broadly, the composition embodying the invention is calculated to provide an economical and effective means for treating cotton fibers to insure a maximum quality product by maintaining the material in a flexible and pliable state whereby an efficient ginning process can be readily accomplished, and whereby static electricity caused by excessive friction can be minimized or eliminated to reduce the fire hazard and the tendency of extraneous substances, such as burs, sticks, and the like, from adhering to the fibers.

The quality of performance of the gin largely determines the quality and grade of the lint cotton staples and has a direct bearing on the spinning qualities of the fiber. The condition of the seed cotton as it reaches the gin stands is also an important factor in the production of the best quality fibers, and due to excessive amount of trash which must be removed from the lint, resulting largely from the use of mechanical harvesting equipment, cleaning operations must be performed with great care to prevent damage to the lint affecting the staple length, and even with the exercise of caution much of the extraneous trash materials adhere to the lint on its way to the gin stands, and this is partly due to the presence of static electricity generated by the movement of the cotton through the apparatus.

Ideally, the seed cotton should contain no more than 9% of moisture to obtain maximum length staple. If too much moisture is present the fibers tend to mat and twist together in strings and the gin saws cut them and reduce their value by increasing the percentage of short fibers. Drying equipment is generally used to remove excess moisture but seed cotton containing excessively high percentages of moisture is often conveyed into the gin stands.

The composition embodying the invention, when applied to the seed cotton, after the drying and cleaning operations, and before introduction to the gin saws, will minimize or eliminate static electricity and thus free much of the adhering extraneous trash substance from the lint, and also aid in reducing the effects of excess moisture remaining therein after the drying operation. Use of the composition will enable the reduction of applied heat normally required to effect a satisfactory moisture content of the seed cotton for an efficient ginning operation. Properly conditioned, the cotton flows freely through the ginning apparatus and minimizes or eliminates shut-down time due to "choke-ups" occurring in the gin stands.

Using a 75% aqueous base, the composition contains up to 12½% of animal or vegetable fats, such as tallow, coconut oil, cottonseed oil, peanut oil, soya oil, and other like vegetable oils, as an active component which was converted to an ionic salt by reaction of the organic acids contained in the animal and vegetable fats and oils with an amine and subsequently with an alkyl ($C_1$–$C_5$) sulfate such as ethyl sulfate, and combined with an alkyl ($C_{1-20}$) substituted quaternary amine halide, such as an ammonium chloride, in the following example:

Example 1

(A) Tallow imidazalinum methosulfate
(B) Ethyl sulfate $$C_2H_5SO_4$$

(C) Dimethyl distearyl ammonium chloride $$[(CH_3)_2(C_{18}H_{37})_2N^+]Cl^-$$

(D) Water

In the foregoing examples, the basic formula for tallow imidazolinium methosulfate is as follows:

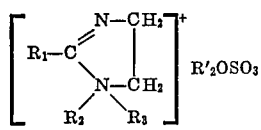

wherein $R_1$ is a tallow radical, wherein $R_2$ is a saturated aliphatic hydrocarbon radical ($C_{2-6}$), wherein $R_3$ is a hydroxy alkyl ($C_{1-5}$), and wherein $R'_2$ is methyl.

In the production of fifty gallons of the composition the following proportions of the several ingredients are expressed as follows by volume, weight and percentages of each:

| Ingredient | Gallons | Weight, lbs. | Percentage |
|---|---|---|---|
| A | 9⅓ | 85.68 | 12½ |
| B | 2 | 18.36 | 7 |
| C | 1⅓ | 11.2 | 5½ |
| Water | 37⅓ | 310.98 | 75 |
| Totals | 50 | 426.22 | 100 |

The ingredients are first blended with water to form an aqueous solution and, by means of an electric probe, the molecular structure thereof is diffused or broken down in the presence of heat applied at about 120° F. to induce permanent suspension of the ingredients. The composition is found to be unaffected by extreme variations in temperatures.

In Example 1 the dimethyl distearyl ammonium chloride functions as a lubricating constituent of the composition.

The composition contains an ionic sulfate salt of an amino compound having at least one hydrocarbon chain derived from animal and/or vegetable fats or oils, such as imidazole or alkyl imidazole compounds (i.e. tallow imadazole sulfate; tallow imidazolinium methosulfate; an ethoxylated cocoamine reacted with an alkyl sulfate; and the like) in a suitable aqueous base.

It has been found useful to include in the composition a low molecular weight alcohol, such as isopropyl alcohol or an ammonium chloride compounds, such as dimethyl distearyl ammonium chloride, and it is sometimes advantageous to use an alkyl sulfate in the composition.

It has been stated that, for best results, the aqueous solution comprising the composition should be injected into the presence of the seed cotton as a finely diffused mist or fog. The application should also be carefully controlled and applied in the most effective manner. Tests have proved that the most effective application of the compound is about 12 ounces to 1500 pounds of seed cotton, or an average bale (500 pounds) of lint cotton.

Tests also prove that up to 70% of the applied amount of the solution evaporates or remains static within the gin machinery where it creates a semi-permanent shield to reduce friction and to protect the cotton as it flows through the equipment. Continuous use of the composition is recommended to maintain the protective shield afforded thereby.

Obviously, variations in the quantities and specific characteristics of the several ingredients of the compound may be resorted to by person skilled in the art, without departing from the spirit and intent of the invention or the scope of the appended claims.

What is claimed is:

1. A liquid cationic composition in the form of an aqueous solution consisting essentially of a 75% water base, 12½% tallow imidazolinium alkyl ($C_{1-5}$) sulfate, 7% alkyl ($C_{2-5}$) sulfate and 5½% dimethyl distearyl ammonium chloride.

2. A liquid cationic composition as set forth in claim 1 for application in a finely diffused mist for treating seed cotton in the ginning process to preserve the fiber staple and luster.

3. A liquid cationic composition as set forth in claim 1 wherein said tallow imidazolinium alkyl sulfate is tallow imidazolinium methosulfate.

References Cited
UNITED STATES PATENTS

| | | | |
|---|---|---|---|
| 3,402,127 | 9/1968 | Mowe | 252—8.75 |
| 3,033,704 | 5/1962 | Sherrill et al. | 252—106 X |
| 3,177,143 | 4/1965 | Lense | 252—8.9 |
| 3,336,222 | 8/1967 | Schaaf et al. | 252—8.7 |
| 2,809,159 | 10/1957 | Welles et al. | 252—8.8 |

HERBERT B. GUYNN, Primary Examiner

U.S. Cl. X.R.
252—8.7, 8.8; 117—139.5 C.Q.